(12) United States Patent
Ono

(10) Patent No.: US 6,937,546 B2
(45) Date of Patent: Aug. 30, 2005

(54) OPTICAL DISK DEVICE WITH IMPROVED TRACK JUMP FEATURES

(75) Inventor: Takayuki Ono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 313 days.

(21) Appl. No.: 10/059,346

(22) Filed: Jan. 31, 2002

(65) Prior Publication Data

US 2002/0110055 A1 Aug. 15, 2002

(30) Foreign Application Priority Data

Feb. 15, 2001 (JP) .................................. P. 2001-038947

(51) Int. Cl.[7] .............................................. G11B 7/08
(52) U.S. Cl. ................................ 369/44.28; 369/30.16; 369/30.17
(58) Field of Search .................... 369/44.28, 30.16, 369/30.17

(56) References Cited

U.S. PATENT DOCUMENTS

| 5,200,937 | A | * | 4/1993 | Hosoya et al. | 369/30.1 |
|---|---|---|---|---|---|
| 5,285,432 | A | * | 2/1994 | Nakane | 369/30.17 |
| 5,612,933 | A | * | 3/1997 | Iso et al. | 369/44.27 |
| 5,696,646 | A | * | 12/1997 | Satoh | 360/78.04 |
| 5,699,332 | A | * | 12/1997 | Nakano | 369/30.16 |
| 5,870,356 | A | * | 2/1999 | Ikeda | 369/30.15 |
| 5,875,161 | A | * | 2/1999 | Takegawa | 369/44.28 |
| 5,933,397 | A | * | 8/1999 | Yamashita et al. | 369/44.28 |
| 5,956,299 | A | * | 9/1999 | Aoki | 369/30.15 |
| 5,959,947 | A | * | 9/1999 | Inoue et al. | 369/30.1 |
| 6,064,633 | A | * | 5/2000 | Kuwayama et al. | 369/30.14 |
| 6,078,454 | A | * | 6/2000 | Takahashi et al. | 360/66 |
| 6,175,465 | B1 | * | 1/2001 | Kawachi et al. | 360/77.08 |
| 6,249,496 | B1 | * | 6/2001 | Tsukahara et al. | 369/44.28 |
| 6,633,521 | B1 | * | 10/2003 | Mochizuki et al. | 369/44.29 |

FOREIGN PATENT DOCUMENTS

JP    10-320938    12/1998

* cited by examiner

*Primary Examiner*—Gautam R. Patel
(74) *Attorney, Agent, or Firm*—Morgan, Lewis & Bockius LLP

(57) ABSTRACT

An optical disk device starts movement of a thread in a track-on state, and releases the track-on state when the thread moves by a certain amount, and gives a driving kick signal to an actuator. The movement of the thread and actuator can be placed in sufficiently good balance so that failure of track jump is prevented, thereby improving the reliability of the device body and suppressing the cost-up of the device body.

4 Claims, 7 Drawing Sheets

THE AMOUNT OF MOVEMENT OF THREAD

OPTICAL DISK DEVICE WITH IMPROVED TRACK JUMP FEATURES

BACKGROUND OF THE INVENTION

1. Field of the Invention

This invention relates an optical disk device for performing read and write of data for an optical disk such as a CD, MD or DVD, and particularly to control of track jump of moving a pick-up head to a target track formed on the recording face of an optical disk.

2. Description of the Related Art

Traditionally, there has been an optical disk for reading the data recorded on the optical disk such as a CD, MD, DVD, etc. and writing data in the optical disk. The optical disk includes a plurality of concentric or spiral tracks formed on the recording face. The optical disk device reads data recorded on the track by detecting the reflected light of an light beam projected on the track. Further, the optical disk device writes data in the track by irradiating the light beam.

Where the data recorded on the track is to be read or the data is to be recorded in the optical disk, in some cases, the optical disk device performs track jump to move a pick-up head to a target track. The target track refers to a track for which the read or write of data is performed. The track jump refers to an operation of moving the irradiating position of an light beam in a radial direction of the optical disk to locate the position on the target track. For example, JP-A-10-320938 discloses conventional control of the operation relative to track jump in the optical disk device.

The pick-up head is placed on a thread which is movable in the radial direction of the optical disk. The thread is adapted to be movable in the radial direction of the optical disk by a thread motor (hereinafter simply referred to as a motor).

The lens of the pick-up head is adapted to be movable for the thread. The lens is adapted to be movable in the radial direction of the optical disk by an actuator.

The track jump includes the cases of moving the thread and not moving the thread. Now, the track jump of moving the thread will be explained below.

First, a kick signal (the kick signal which is first given at the start of track jump is referred to a driving kick signal) is applied to a motor to start the movement of the thread. The driving kick signal is given with a prescribed magnitude and for a prescribed time. After the driving kick signal has been stopped, the kick signal (hereinafter referred to as an accelerating kick or decelerating kick) having a magnitude corresponding to the moving speed of the thread is applied to perform the constant speed control of moving the thread toward the target track at a constant speed.

The constant speed control employs the wavelength (period) of a tracking error signal described later. Further, after a lapse of a prescribed time from when the driving kick signal is applied to the motor, the kick signal is applied to the actuator so that the moving control of the lens of the thread and actuator is started.

The irradiating position of the light beam successively traverses the tracks formed on the recording face of the optical disk. A mirror section which totally reflects the light beam is formed between the adjacent tracks. On the basis of the amount of light reflected from the optical disk, a sinusoidal tracking error signal (TE signal) is obtained which represents that the lens center traversed the track. The tracking error signal is created by a wavelength whenever the lens center traverses the track. Therefore, by counting the number of the waves of the tracking error signal, the number of the tracks which the lens center has traversed is obtained. Further, on the basis of the wavelength (period) of the tracking error signal, the moving speed of the lens relative to the optical disk is obtained.

Immediately before starting the track jump, the optical disk device computes the number of tracks over which the lens center must move to reach the target track. Concretely, the number of tracks to move is computed on the basis of a difference between the track address representative of the present track position and that representative of the target track position.

When the lens center approaches the target track to a certain degree, the optical disk device brakes the motor to stop the thread beforehand. For example, when the lens center reaches the track located 100 tracks before the target track, the thread is stopped. Thus, the pick-up head body moves to the vicinity of the target track.

In this case, the optical disk device does not stop the movement of the lens by the actuator, but continues the movement of the lens toward the target track. When the optical disk device judges that the lens center has reached the target track on the basis of the counted number of waves of the tracking error signal, it causes the lens center to track on the target track by tracking servo.

Meanwhile, when the driving kick signal is simultaneously applied to the thread and actuator, since the thread has poorer response than that of the actuator, the actuator starts to move before the thread starts to move. Therefore, the thread and the actuator move separately so that the subsequent control cannot be carried out appropriately. This presents a problem of greatly vibrating the lens and others. In such a case, there is strong possibility of the track jump ending in failure. In order to obviate such an inconvenience, a method has been proposed which applies the driving kick signal to the actuator after a lapse of a prescribed time after the driving kick signal has been applied to the thread as described above.

However, the time taken from when the driving kick signal is applied to the motor to when the thread starts to move is affected by the friction force generated when the thread is moved. The friction force varies according to the elements which constitute the thread. Therefore, the conventional method which applies the kick signal to the actuator after a lapse of a prescribed time provides some devices in which the thread has already moved excessively and some devices in which the thread does not almost move (there are unevenness among the devices). Thus, in order to control the thread and actuator in good balance, the above prescribed time from when the driving kick signal is applied to the motor to when the kick signal is applied to the actuator must be set for each device. This presents a problem of complicating the process of manufacturing the device body and hence cost-up.

SUMMARY OF THE INVENTION

This invention has been made under the above circumstances, and therefore an object of this invention is to provide an optical disk which can perform track jump involved with movement of a thread appropriately and also can restrain cost-up.

In order to achieve the above object, an optical disk according to this invention has the following configurations in order to solve the above problem.

(1) The optical disk device comprises:

a thread on which a pick-up head is placed, said pick-up head serving to read data recorded on an optical disk by irradiating a track formed on a recording face of said optical disk with an optical beam focused by a lens and detecting the reflected light;

a lens moving means for moving the lens of said pick-up head relative to said thread in a radial direction of said optical disk;

a thread moving means for moving said thread as well as said pick-up head in the radial direction of the optical disk; and a movement control means for controlling said thread moving means to start movement of said thread, and thereafter when it is detected that said lens has deviated from said prescribed track by a prescribed amount or more owing to movement of said thread, starting the movement of said lens by said lens moving means.

(2) The above movement control means, until said lens deviates from the prescribed track by a prescribed amount or more, controls said thread moving means to apply force having a prescribed magnitude to said thread continuously.

(3) The above movement control means, when the center of the lens has deviated from the center of the predetermined track, controls said thread moving means and said lens moving means to control the moving speed of the lens at a constant speed.

In this configuration, in a "track-on" state where the center of the lens of the pick-up head is located on the center of a predetermined track, the movement of the thread is started. Therefore, when the thread does not yet move, or has moved a little, the center of the lens is situated on the center of the predetermined track. When the thread starts to move, the body of the pick-up head will gradually deviate from the center of the predetermined track with movement of the thread. However, because of the track-on state, control is made so that the lens is situated on the center of a predetermined track by the lens moving means. Thus, the force taken for the lens moving means to situate the lens on the center of the predetermined track, i.e. "tracking servo signal" increases gradually. By detecting the magnitude of the tracking servo signal, the amount of movement of the thread can be detected.

When the thread has moved by a suitable amount, i.e. the tracking servo-signal has increased by a predetermined amount or more, the track-on state is released and the movement of the lens is controlled at a constant speed by the thread moving means and the lens moving means.

Thus, without being affected by unevenness in the components constituting the thread, whenever the thread moves by a suitable amount, the movement of the lens can be started by the lens moving means. Thus, during the track jump, the movement of the thread and movement of the lens by the lens moving means can be stabilized. This prevents the failure of track jump, thereby improving the reliability of the device body and also suppressing the increase of the production cost of the device body.

DETAILED DESCRIPTION OF THE PREFERRED EMBODIMENTS

Now, a description will be given in more detail of preferred embodiments of this invention with reference to the accompanying drawings.

Figure 1:
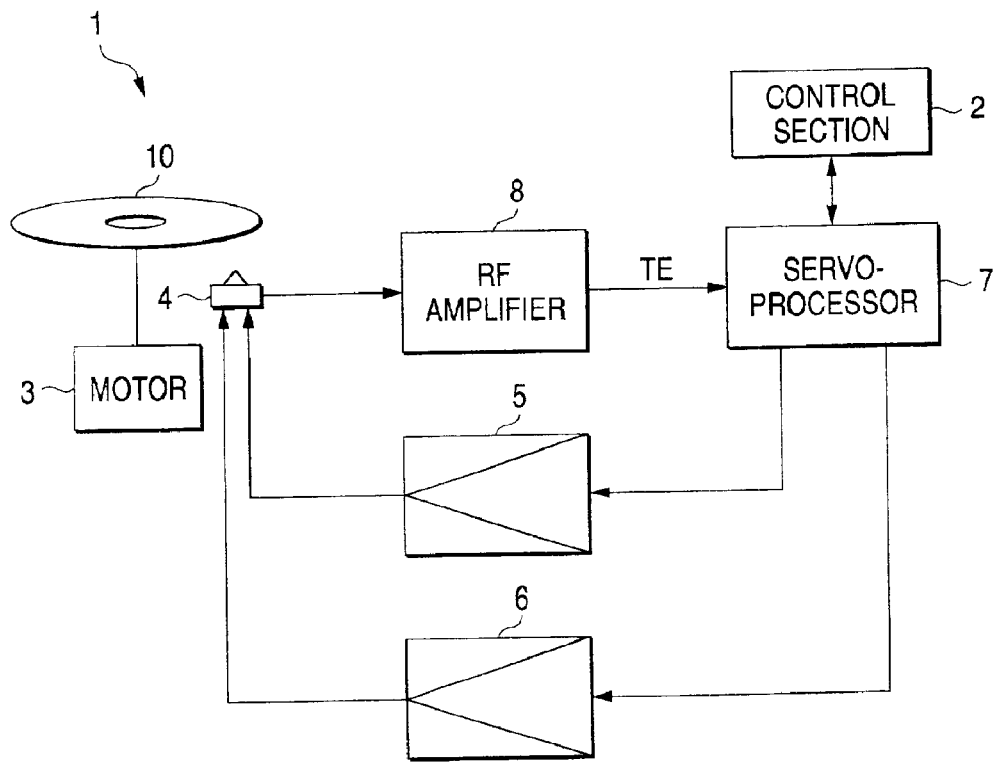
FIG. 1 is a view showing the configuration of the main part of an optical disk device which is an embodiment of this invention.

FIG. 1 is a block diagram showing the construction of the main portion of an optical disk device which is an embodiment of this invention. An optical disk device 1 according to this embodiment serves to read the data recorded in the optical disk 10 such as a CD, MD, DVD, etc. or write the data in the optical disk 10. Reference numeral 2 denotes a control section for controlling the operation of the device body. Reference numeral 3 denotes a spindle motor for rotating the optical disk 10 loaded in the device body. Reference numeral 4 denotes a pick-up head for irradiating the optical disk with a light beam and detecting the light reflected from the optical disk 10. The pick-up head 4 includes a light-projecting unit, a four-divided photo-diode and an objective lens 4a.

Figure 2:
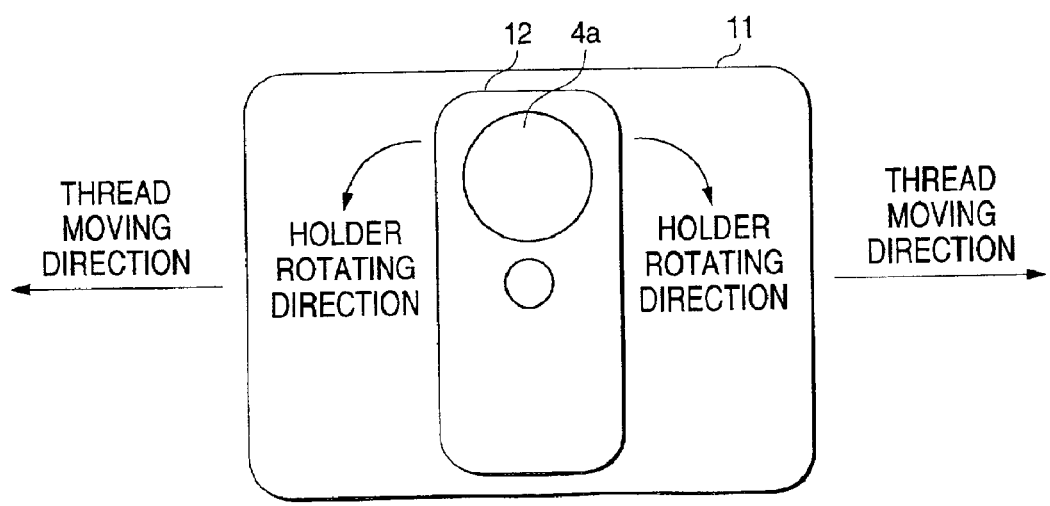
FIG. 2 is a view showing the thread and holder on which the pick-up head of the optical disk device which is an embodiment of this invention.

As shown in FIG. 2, the pick-up head 4 is placed on a thread 11. The thread 11 is adapted to be movable in the radial direction (direction indicated by an arrow in FIG. 2) of the optical disk 10 by a thread motor (not shown). The objective lens 4a of the pick-up head 4 is attached to a holder 12. The holder 12 is rotatably attached to a rotary shaft provided in the vicinity of the center of the thread 11. The holder 12 rotates in the direction indicated by arrows in FIG. 2. The holder 12 is rotated by the actuator (not shown). The rotation of the holder 12 moves the lens 4a in the radial direction of the optical disk 10. Incidentally, it should be noted that the holder 12 is adapted to be movable also in the direction of the rotary shaft of the spindle motor 3 for rotating the optical disk 10.

Reference numeral 5 denotes a tracking driver for applying a control signal (kick signal, brake signal, tracking servo signal (TS signal), etc.) to the above actuator to rotate the holder 12 relative to the thread 11. The rotation of the holder 12 moves the lens 4a in the radial direction of the optical disk 10.

Reference numeral 6 denotes a thread driver for applying a control signal (kick signal, brake signal, etc.) to the above thread motor to move the thread 11 in the radial direction of the optical disk 10. With the movement of the thread 11, the pick-up head 4 moves in the radial direction of the optical disk 10.

Reference numeral 7 denotes a servo-processor for applying a signal to the tracking driver 5 and thread driver 6. Reference numeral 8 denotes an R-F amplifier for generating a tracking error signal described later.

With the aid of a split photo-diode, the pick-up head 4 detects the reflected light of a light beam irradiating the optical disk 10 from a projecting section, and supplies the output from the split photo-diode to the RF amplifier 8. The RF amplifier 8 creates a tracking error signal on the basis of the signal (output from the split photo-diode) supplied from the pick-up head 4. The tracking error signal thus created is supplied to the servo-processor 7.

Incidentally, it should be noted that during reproducing, the RF amplifier 8 creates a reproduction signal on the basis of the output from the split photo-diode. The reproduction signal is produced from an output section (not shown). During recording, the control section 2 controls the projecting section of the pick-up head 4 to write the data in the optical disk 10. The details of the operation during the reproducing and recording will not be explained here.

The tracking error signal represents a deviation of the position irradiated with the light beam from the center of a track formed on the optical disk 10. The irradiated position is a position opposite to the center of the lens 4a.

The servo-processor 7 exerts tracking servo in a track-on state. Exerting the tracking servo refers to apply the tracking servo signal created on the basis of the tracking servo signal to the tracking driver 5. The tracking driver 5 drives the actuator on the basis of the tracking servo signal to locate the center of the lens 4a, i.e. position irradiated with the light beam to the center of the track.

Figure 3:
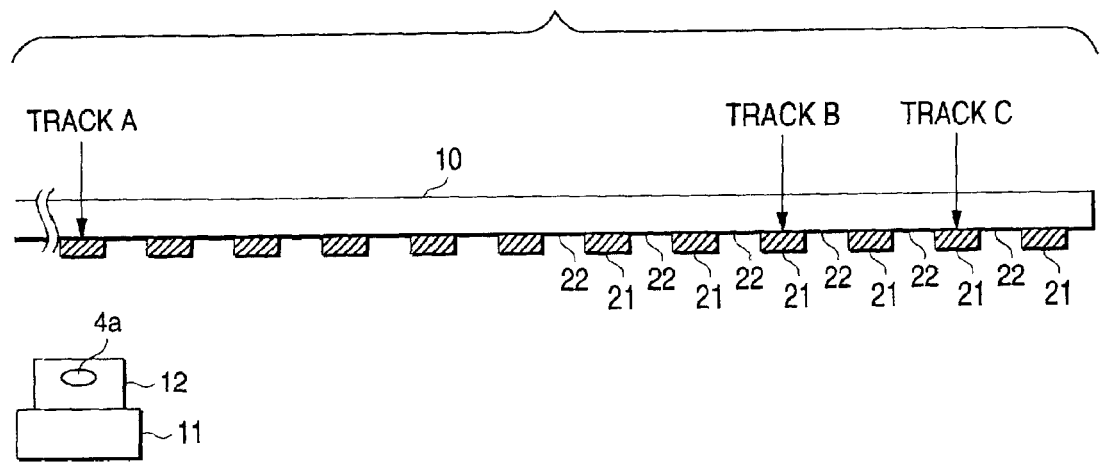
FIG. 3 is a view showing a section of the optical disk.

An explanation will be given of the operation of track jump in the optical disk device 1 according to this embodiment. As well known, the optical disk 10 includes a plurality of tracks 21 spirally or concentrically formed on the recording face. A mirror portion 22 is formed between the adjacent tracks 21 (FIG. 3). The mirror portion 22 is a total reflection region. Incidentally, FIG. 3 shows a section of the optical disk 10 with the lower face being the recording face. It should be noted that the optical disk 10 actually includes the tracks 21 formed more densely.

The operation of track jump will be explained taking an example from the track jump from track A to track C shown in FIG. 3. The optical disk device 1 has recognized the positions of the track A and the track C. It is assumed that the track A and the track C are apart from each other by several hundreds of tracks. In FIG. 3, it is assumed that track B is located between the track A and track C, and apart from the track C by 100 tracks.

An output from the split diode, which is the reflected light of the light beam with which the recording face of the optical disk is irradiated is detected, is supplied to the RF amplifier 8. On the basis of the supplied output from the split photodiode, the RF amplifier 8 creates a tracking error signal.

Figure 4:
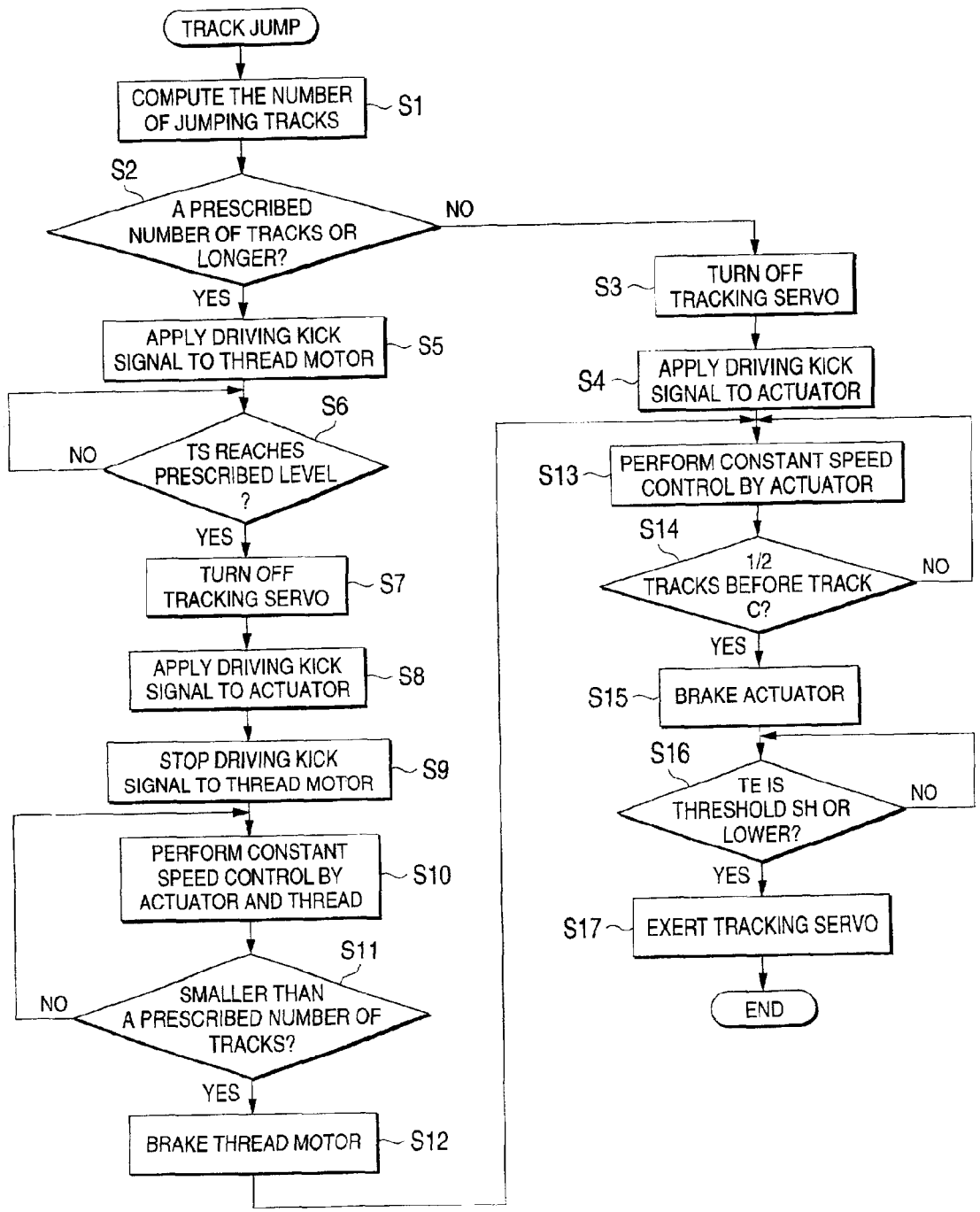
FIG. 4 is a flowchart showing the processing of track jump of the optical disk device which is an embodiment of this invention.
Figure 5:
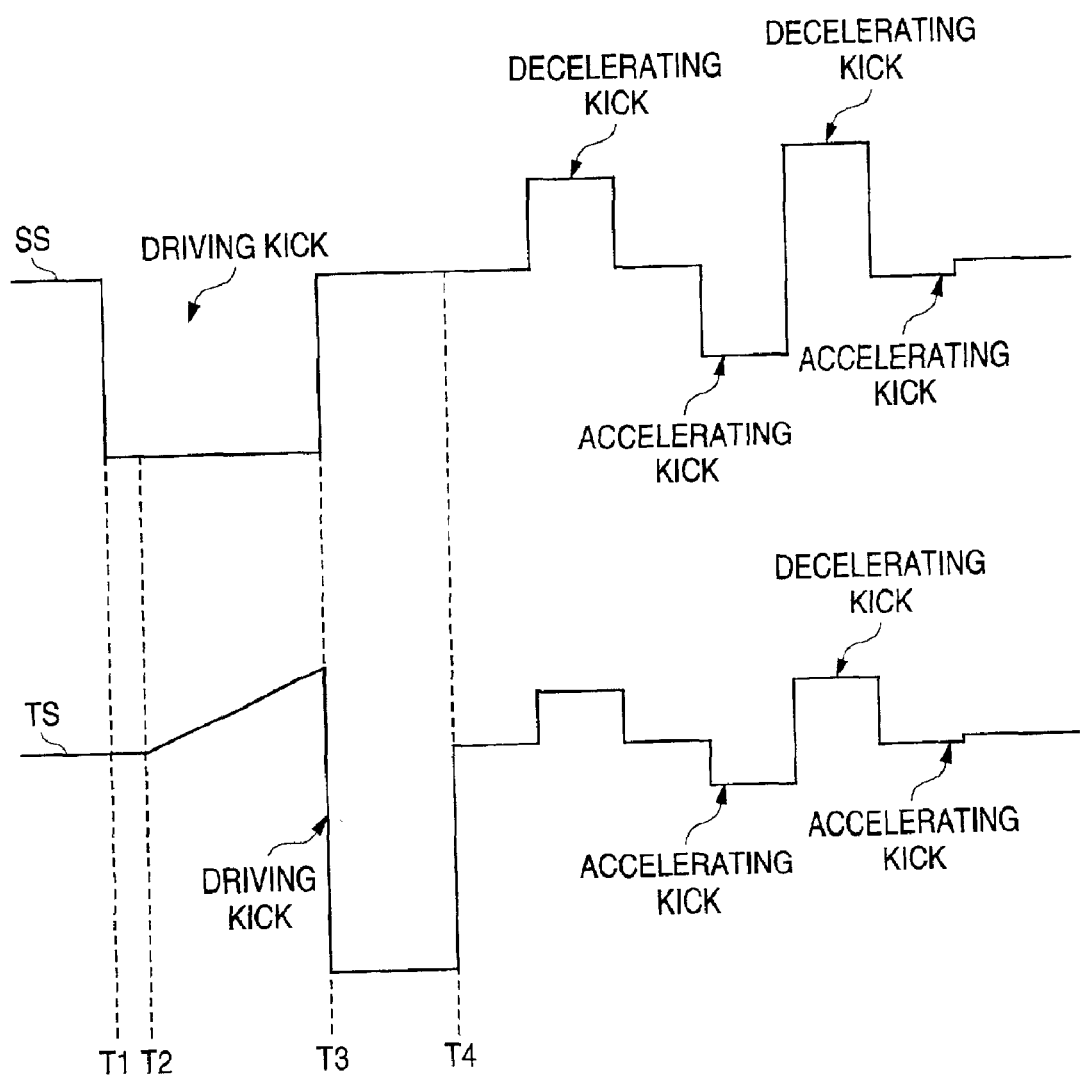
FIG. 5 is a timing chart showing the control of a thread and an actuator during track jump in the optical disk device which is an embodiment of this invention.
Figure 6:
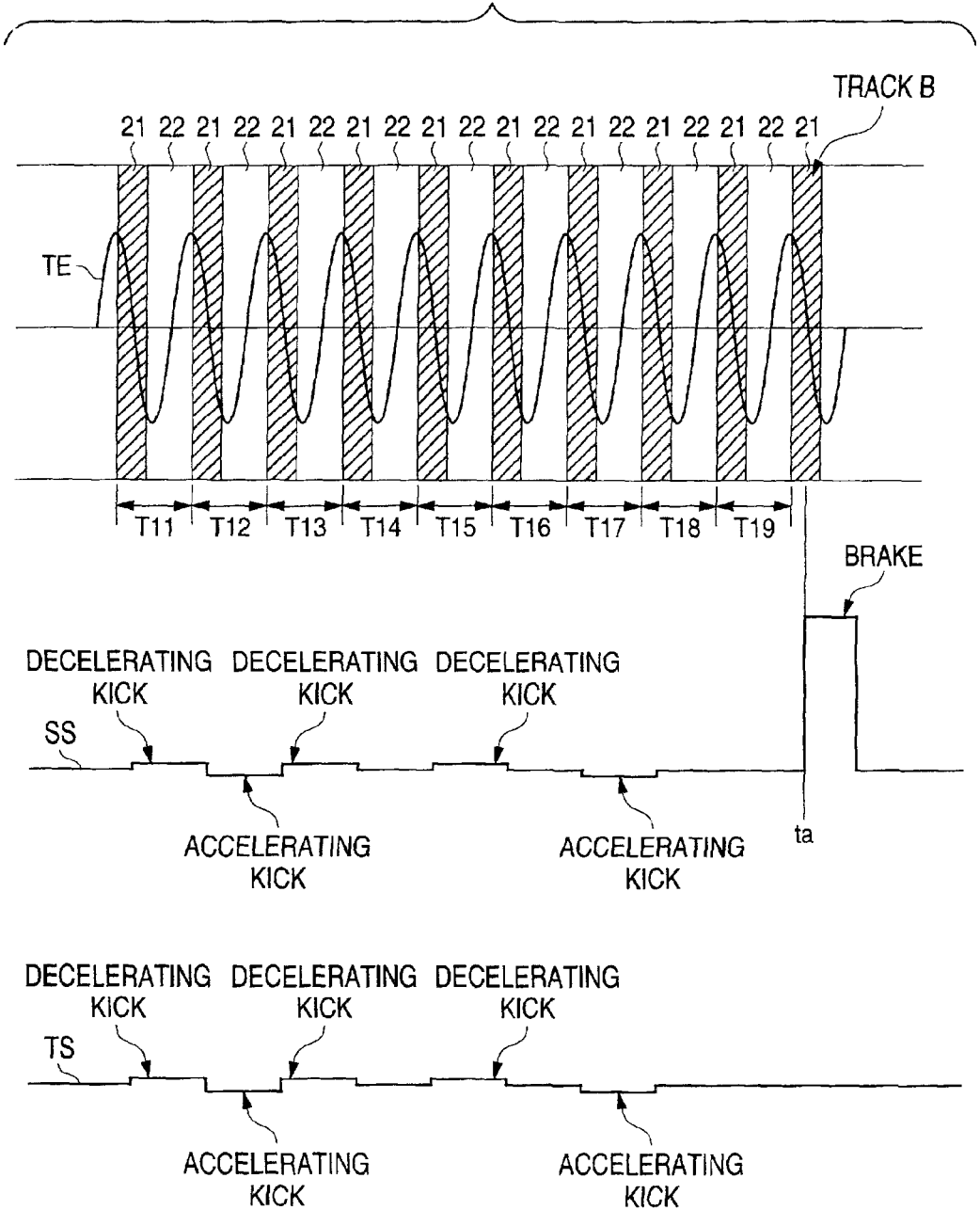
FIG. 6 is a timing chart showing the control of a thread and an actuator during track jump in the optical disk device which is an embodiment of this invention.
Figure 7:
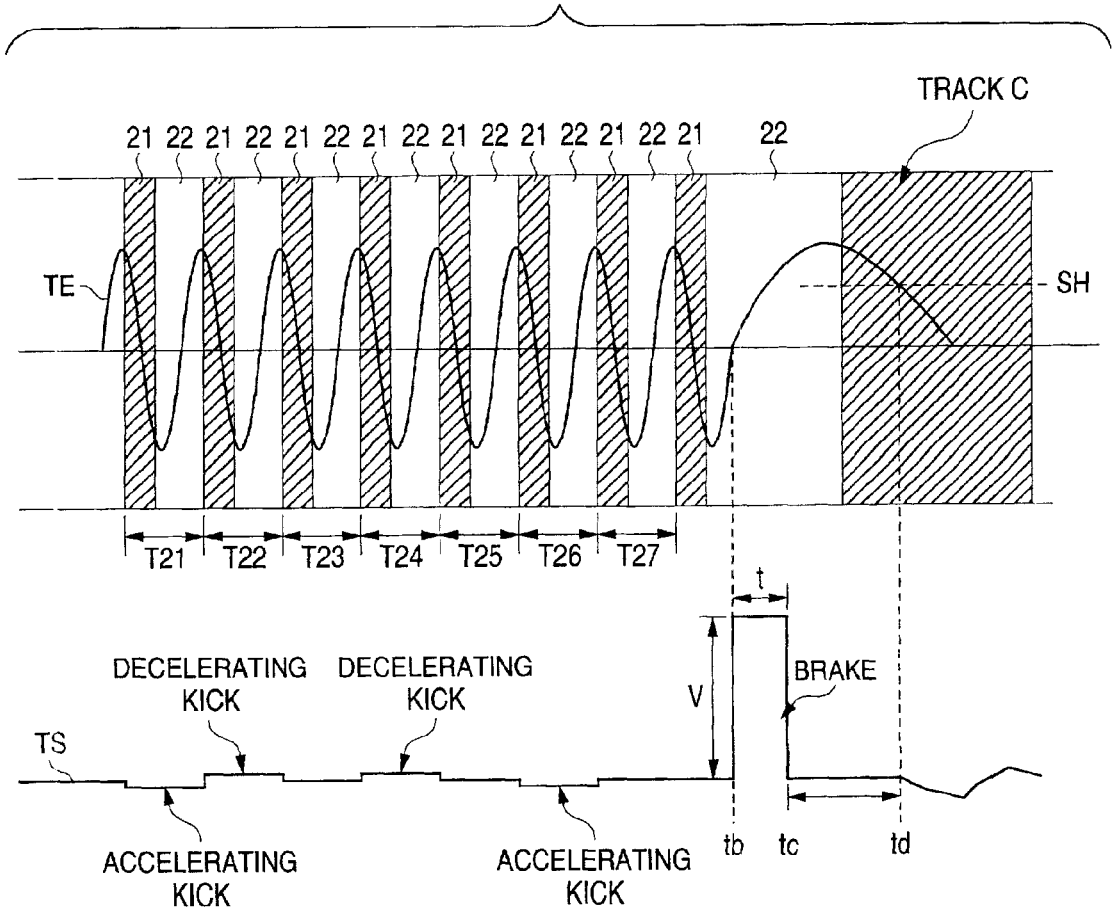
FIG. 7 is a timing chart showing the control of a thread and an actuator during track jump in the optical disk device which is an embodiment of this invention.

FIG. 4 is a flowchart showing the operation of track jump. FIGS. 5 to 7 are timing charts which show the control of track jump. In the optical disk 1, the number of tracks from the track A to the track C, i.e. the number of jumping tracks is computed (s1). It is decided whether the number of tracks computed in s1 is not smaller than a prescribed number of tracks (hereinafter referred to as "prescribed number of tracks") (s2). Now it is assumed that the prescribed number of tracks is 101.

If it is decided in s2 that the computed number of tracks is smaller than the prescribed number of tracks, the tracking servo is turned off (s3), and a driving kick signal is applied to the actuator. Thereafter, the processing jumps to s13 described later.

On the other hand, if it is decided in s2 that the computed number of tracks is not smaller than the prescribed number of tracks, the processing of s5 to s12 described below is executed. Thereafter, the processing of s13 et seq. will be executed.

A driving knock signal having a prescribed magnitude is applied to the thread motor (s5) (T1 in FIG. 5). At this time, the tracking servo is still active in the track-on state. Therefore, the actuator is controlled by the tacking driver 5 so that the center of the lens 4a is located on the track A. Although not shown in FIG. 5, the tracking error signal is at a substantially constant level.

Figure 8A:
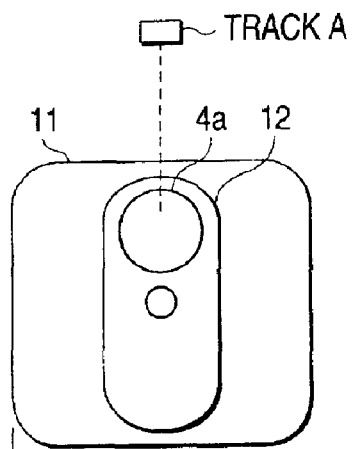
FIG. 8 is views showing the movement of the thread and actuator of the optical disk device which is an embodiment of this invention.
Figure 8B:
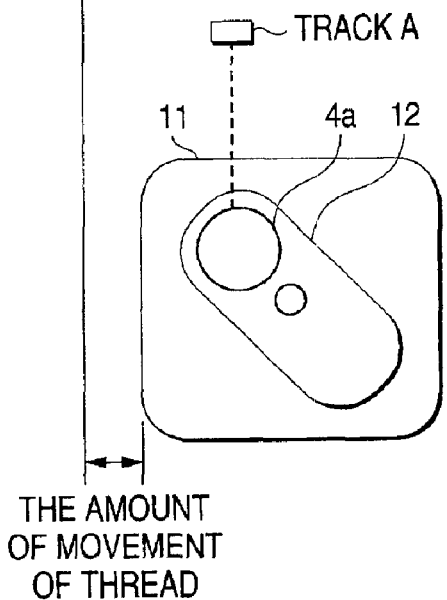

The thread 11 starts to move toward a target track C after a short time from when the driving kick signal has been applied (T2 in FIG. 5). Therefore, the tracking sever signal applied to the actuator by the tracking driver 5 increases gradually. This is because the pick-up head 4 as well as the thread 11 moves toward the target track C when the thread 11 starts to move the target track C. Specifically, in a state shown in FIG. 8A, when the thread 11 starts to move toward the target track C as a result of application of the driving kick signal to the thread 11, since the tracking servo is active, the actuator rotates the holder 12 according to the amount of movement of the thread to locate the center of the lens 4a to the track A (FIG. 8B). Thus, the tracking servo signal applied to the actuator gradually increases.

When the tracking servo signal reaches a prescribed level (s6) (T3 in FIG. 5), the tracking servo is turned off and the driving kick signal is applied to the actuator (s7, s8). Further, application of the driving kick signal to the thread motor is stopped (s9). It should be noted that the prescribed driving signal having a predetermined magnitude is applied to the actuator for a prescribed time.

Figure 8C:
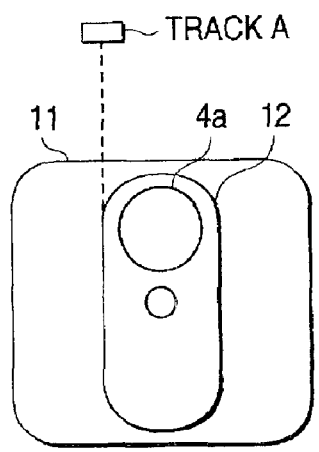

Thereafter (after T4 shown in FIG. 5), the accelerating kick and deceleration kick are applied to the thread 11 and actuator (s10, s11) to perform constant speed control until the center of the lens 4a reach the track B (s10, s11). The control is made so that the actuator is located at a reference position relative to the thread 11 (FIG. 8C), and the speed of the lens 4a is constant.

Now referring to FIG. 6, an explanation will be given of the constant speed control of the thread 11. The servo processor 7 detects can detect the moving speed of the thread 11 by detecting the period of the tracking error signal supplied from the RF amplifier 8. As described above, since the tracking error signal is a sinusoidal signal produced whenever the center of the lens 4a traverses each of the tracks 21, the period of the tracking error signal varies according to the moving speed of the thread 11. Specifically, as the moving speed of the lens 4a becomes high, the period of the tracking error signal becomes short. Inversely, as the moving speed of the lens 4a becomes low, the period of the tracking error signal becomes long.

The servo processor 7 applies the accelerating kick or decelerating kick to the tracking driver 5 and the thread driver 6 as a servo signal so that the period (T11–T19 in FIG. 6) of the tracking error signal is equal to a prescribed period. The tracking driver 5 and the thread driver 6 control the moving speed of the lens 4a on the basis of the accelerating kick or decelerating kick thus applied.

Incidentally, by counting the number of waves of the tracking error signal, the number of tracks which the pick-up head 4 (lens 4) has crossed can be detected.

As described above, at the timing when the thread 11 moved by a prescribed amount the tracking servo is turned off, and the moving control of the actuator is started. For this reason, the actuator can be moved at the timing when the thread has moved by the prescribed amount without being affected by unevenness in the components constituting the thread and in the friction force produced when the thread 11 has been moved. Thus, the thread 11 and actuator can be always situated in good balance.

When the center of the lens 4a reaches (ta in FIG. 6), the thread motor is braked down (s12). Thereafter, the constant speed is performed by the actuator until the lens 4a reaches the track C (s13, s14).

In this case also, the RF amplifier 8 applies the tracking error signal created on the basis of the input from the pick-up head 4 to the servo processor 7. The servo-processor 7 performs the constant speed control of moving the lens 4a at a prescribed constant speed with the aid of the actuator until the center of the lens 4a reaches ½ track before the track C.

As seen from FIG. 7, the constant speed control in s13 is to apply the accelerating kick or decelerating kick to the tracking driver 5 and the thread driver 6 so that the period (T21–T27) of the tracking error signal supplied from the RF amplifier 8 is equal to a prescribed period.

When the center of the lens 4a reaches ½ track before the track C (tb in FIG. 7), the tracking driver 5 is braked to stop the movement of the lens 4a by the actuator (s15).

In s15, the servo processor 7 controls the amount of braking according to the moving speed of the lens 4a when it has crossed the immediately preceding track. Specifically, the braking amount is controlled to the period of the sinusoidal wave produced when the lens 4a has crossed the immediately preceding track in the tracking error signal supplied from the RF amplifier 8, i.e. the amount according to T27 in FIG. 7. Incidentally, the control of the amount of braking may be made in terms of either or both of the time t of braking and value of the braking.

When the servo processor 7 completes application of the braking signal, it waits for the level of the tracking error signal supplied from the RF amplifier 8 to fall to a prescribed threshold SH or lower (s16).

Incidentally, it should be noted that the lens 4a does not stop completely, but is moving at a speed approximately zero toward the track C.

When the level of the tracking error signal falls to the threshold SH, the servo-processor 7 exerts the tracking servo (s17).

As shown in FIG. 7, the threshold SH is set at a level where the center of the lens 4a is located on the track C. The servo-processor 7 does not apply the accelerating kick or decelerating kick to the tracking driver 5 during the period between the timing tc when the braking has been completed and the timing td when the level of the tracking error signal has fallen to the threshold SH or lower.

Therefore, the servo-processor 7 exerts the tracking servo when the center of the lens 4a is located on the track (track C), thereby realizing the track-on.

In the above description, the tracking servo is exerted when the level of the tracking error signal has fallen to the threshold SH or lower, thereby realizing the track-on. However, the tracking servo maybe exerted while the level of the tracking error signal is within a prescribed range and has fallen, thereby realizing the track-on.

Further, when the servo-processor 7 exerts the tracking servo, it also produces a focus-servo signal to make focus adjustment of the lens 4a. The focus adjustment is carried out in such a way that the lens is driven by an actuator for focusing (not shown).

Thus, without being affected by unevenness in the components constituting the thread and in the friction force produced when the thread 11 has been moved, the optical disk device according to this invention can stabilize the balance between the movement of the thread 11 when the driving kick signal therefor has stopped and that of the lens 4a by the actuator. Therefore, since the processing in and subsequent to step s8 and is stably performed in FIG. 4 described above, the failure of track jump can be prevented, thereby improving there liability of the device body and suppressing the increase of the production cost of the device body.

Further, in order to stop the center of the lens 4a on the target track, the amount of braking applied to the actuator is adjusted to the magnitude corresponding to the immediately preceding moving speed of the lens 4a, and the tracking servo is not exerted for track-on immediately after the braking has been completed, but the track-on is realized after the center of the lens 4a is located on the target track. For this reason, when the center of the lens 4a is located on the mirror portion 22, the tracking servo is not exerted to realize the track-on and occurrence of track slippage is prevented. Thus, the operation of track jump permits the center of the lens to be located on the target track, thereby improving the reliability of the device body.

As described above, in accordance with this invention, without being affected by unevenness in the components constituting the thread, whenever the thread moves by a suitable amount, the movement of the lens can be started by the lens moving means. Thus, during the track jump, the movement of the thread and movement of the lens by the lens moving means can be stabilized. This prevents the failure of track jump, thereby improving the reliability of the device body and also suppressing the increase of the production cost of the device body.

What is claimed is:

1. An optical disk device comprising:

a thread on which a pick-up head is placed, said pick-up head serving to read data recorded on an optical disk by irradiating a track formed on a recording face of said optical disk with an optical beam focused by a lens and detecting the reflected light, wherein said pick-up head includes a holder that holds the lens, the holder being rotatable with respect to the thread;

a lens moving unit adapted to rotate the holder of said pick-up head relative to said thread;

a thread moving unit adapted to move said thread as well as said pick-up head in the radial direction of the optical disk; and a movement controller adapted to control said thread moving unit to start movement of said thread while controlling said lens moving unit to perform track-on control so that the lens of said pick-up head is located on a prescribed track, and thereafter when it is detected that said thread has moved a prescribed amount on the basis of a tracking servo signal potential starting the rotation of said holder by said lens moving unit, wherein said movement controller also detects whether or not said lens and said prescribed track are displaced from each other because the tracking servo signal has exceeded a prescribed potential, and when the prescribed potential is exceeded, controlling said thread moving unit by terminating an applied drive kick signal, and controlling said lens moving unit by terminating the tracking servo signal and applying the drive kick signal to said lens moving unit.

2. An optical disk device comprising:

a thread on which a pick-up head is placed, said pick-up head serving to read data recorded on an optical disk by irradiating a track formed on a recording face of said optical disk with an optical beam focused by a lens and detecting the reflected light, wherein said pick-up, head includes a holder that holds the lens, the holder being rotatable with respect to the thread;

a lens moving unit adapted to rotate the holder of said pick-up head relative to said thread;

a thread moving unit adapted to move said thread as well as said pick-up head in the radial direction of the optical disk; and a movement controller adapted to control said thread moving unit to start movement of said threads and thereafter, when it is detected that said lens has deviated from said prescribed track by a prescribed amount or more owing to movement of said thread, starting the rotation of said holder by said lens moving unit.

3. The optical disk device according to claim 2, wherein until a center of said lens deviates from the prescribed track by a prescribed amount or more, said controller controls said thread moving unit to apply force having a prescribed magnitude to said thread continuously.

4. The optical disk device according to claim 2, wherein when the center of said lens deviates from the center of said prescribed track by a prescribed amount or more, said controller controls said thread moving unit and said lens moving unit to control the moving speed of the lens at a constant speed.

* * * * *